United States Patent
K et al.

(10) Patent No.: US 11,342,678 B1
(45) Date of Patent: May 24, 2022

(54) DUAL POLARIZED MIMO UWB SYSTEM: A METHOD AND DEVICE THEREOF

(71) Applicants: Malathi K, Chennai (IN); Sandeep Kumar P, Chennai (IN); Gulam Nabi Alsath M, Chennai (IN); Padmathilagam S, Cuddalore (IN); Vikneshwaran M, Thanjavur (IN)

(72) Inventors: Malathi K, Chennai (IN); Sandeep Kumar P, Chennai (IN); Gulam Nabi Alsath M, Chennai (IN); Padmathilagam S, Cuddalore (IN); Vikneshwaran M, Thanjavur (IN)

( * ) Notice: Subject to any disclaimer, the term of this patent is extended or adjusted under 35 U.S.C. 154(b) by 70 days.

(21) Appl. No.: 17/099,841

(22) Filed: Nov. 17, 2020

(51) Int. Cl.
| | |
|---|---|
| *H01Q 9/40* | (2006.01) |
| *H01Q 1/52* | (2006.01) |
| *H01Q 1/48* | (2006.01) |
| *H04B 7/0413* | (2017.01) |

(52) U.S. Cl.
CPC ............... *H01Q 9/40* (2013.01); *H01Q 1/48* (2013.01); *H01Q 1/521* (2013.01); *H04B 7/0413* (2013.01)

(58) Field of Classification Search
CPC ............ H01Q 9/40; H01Q 1/48; H01Q 1/521; H01Q 7/0413
See application file for complete search history.

(56) References Cited

U.S. PATENT DOCUMENTS

| | | | | |
|---|---|---|---|---|
| 6,424,309 B1* | 7/2002 | Johnston | ............... | H01Q 13/10 |
| | | | | 343/795 |
| 7,015,868 B2* | 3/2006 | Puente Baliarde | .... | H01Q 5/307 |
| | | | | 343/800 |
| 9,484,634 B1* | 11/2016 | Behroozi | ................. | H01Q 1/28 |
| 11,284,064 B2* | 3/2022 | Roe | ......................... | H01Q 9/42 |
| 2002/0057227 A1* | 5/2002 | Fang | ...................... | H01Q 1/242 |
| | | | | 343/702 |
| 2005/0057410 A1* | 3/2005 | Chiang | .................. | H01Q 1/243 |
| | | | | 343/702 |
| 2010/0328163 A1* | 12/2010 | Abramov | ................. | H01Q 9/40 |
| | | | | 343/837 |
| 2015/0054696 A1* | 2/2015 | Werner | .................. | H01Q 1/273 |
| | | | | 343/718 |
| 2017/0084985 A1* | 3/2017 | Ku | ........................ | H01Q 1/243 |

(Continued)

*Primary Examiner* — Graham P Smith
*Assistant Examiner* — Jae K Kim

(57) ABSTRACT

The embodiments herein provide a dual-polarized MIMO ultra-wideband system comprising of a linear polarized radiator and circularly polarized radiator. A Symmetric Heptagonal Monopole (SHM) radiating element coupled with a Stepped Co-Planar Waveguide (SCW) provides an ultra-wide bandwidth with linear polarization. An Asymmetric Ruby Shaped Monopole Radiator (ARSM) aided along with a Modified Asymmetric Ground Plane (MAGP) provides the resonance for the entire ultra-wide bandwidth with circular polarization. Modified Asymmetric Ground Plane (MAGP) reduces the cross-polarization between the radiators. Good isolation is achieved using Rectangular Slots (RS) deployed between the radiators. The Symmetric Heptagonal Monopole (SHM) radiating element embedded with Stepped Coplanar Waveguide (SCW), and an Asymmetric Ruby Shaped Monopole (ARSM) radiating element placed above a Modified Asymmetric Ground Plane (MAGP) is configured on a single platform to realize the proposed dual-band UWB MIMO system.

12 Claims, 2 Drawing Sheets

(56) References Cited

U.S. PATENT DOCUMENTS

| | | | |
|---|---|---|---|
| 2019/0393597 A1* | 12/2019 | Kosaka | H01Q 15/14 |
| 2022/0059935 A1* | 2/2022 | Zhang | H01Q 1/283 |
| 2022/0077575 A1* | 3/2022 | Kim | H01Q 7/00 |

* cited by examiner

DUAL POLARIZED MIMO UWB SYSTEM: A METHOD AND DEVICE THEREOF

TECHNICAL FIELD

The present invention is related to microwave devices and more particularly a dual-polarized MIMO UWB system suitable for integration into any electronic platforms such as medical imaging and any wireless communications.

BACKGROUND OF THE INVENTION

Research on MIMO (Multiple Input Multiple Output) technology has piled up because of its well-known advantages such as high data rate transmission, Spectral efficiency, and channel capacity. Multipath fading is a fatal problem in wireless communication signals with different amplitudes and phases when combines often produce destructive interference at the receiver side. They occur due to the diffraction and reflection from the interactive antennas and especially in WBAN application, due to scattering effects from the indoor environment and the movement of the human body parts such as arm and leg resulting in the polarization losses when works close to the body tissues. The best solution for overcoming the multipath fading is diversity technology, such as spatial diversity, pattern diversity and polarization diversity, etc. Diversity system can be mounted in a base station or mobile terminal to improve the transmission capacity and link reliability without increasing power consumption and bandwidth. The overall performance of the MIMO diversity system is determined by the signals received by the individual radiating element and their correlation should be maintained as low as possible. Technological advantages of the UWB application band such as wide spectral coverage, low power consumption, and reduced electromagnetic sensitivity become more applicable for short-range communication. The combination of UWB technology with a diversity/MIMO system is a progressing research area. Polarization diversity is an impressive technique to mitigate the multipath-fading effect and polarization mismatch losses, especially in rich scattering environments.

Polarization diversity is one of the diverse techniques that use different polarization for different scenarios. To introduce polarization diversity, multiple radiators are required to provide independent sub-channels with different polarization. Generally, linear polarization characteristics are suitable for transmission to limit the transmit power, and circular polarization characteristics are suitable for the reception to limit the polarization mismatch losses. Large size, complex geometry, poor isolation between radiators, and limited Axial ratio bandwidth coverage are major concerns in the MIMO diversity system. In this work, the prime aim is to limit transmit power and to improve the reception quality. The Polarization diversity system is designed by holding linear and circular polarization characteristics using distinct radiators. This is the first initiative that integrates linear polarized radiator and circularly polarized radiator into a single PCB board. The proposed system is designed by overcoming the above-mentioned issues with quintessential features such as low profile, simple geometry, required ARBW coverage, good gain, and radiation efficiency.

OBJECTIVE OF THE INVENTION

The primary objective of the present invention is to design a Dual polarized MIMO UWB system.

Yet another objective of the present invention is to design a compact monopole radiator supported by coplanar waveguide technology that can provide a continuous resonance for the entire ultra-wideband with linear polarization characteristics.

Yet another objective of the present invention is to design a single fed monopole radiator with the smallest dimension providing the ultra-wide bandwidth along with circular polarization characteristics.

Yet another objective of the present invention is to reduce the cross-coupling and cross-polarization between the two radiators integrated into a single platform through the arrangement of radiators diagonally opposite to each other aided along with some isolation techniques.

These and other objects and advantages of the present invention will become readily apparent from the following detailed description taken in conjunction with the accompanying drawings.

SUMMARY OF THE INVENTION

The various embodiments of the present invention provide a dual-polarized MIMO system contains a plurality of radiators with distinct polarization characteristics and with reduced interference between the radiators. The embodiments of the present invention provide a dual-polarized MIMO UWB system comprising of a Symmetric Heptagonal Monopole (SHM) radiating element coupled with the Stepped Co-Planar Waveguide (SCW) and an Asymmetric Ruby Shaped Monopole (ARSM) radiating element are positioned above a conducting Modified Asymmetric Ground Plane (MAGP) configured to provide resonance for the entire ultra-wideband frequency range.

According to an embodiment, the dual-polarized MIMO system, includes a Symmetric Heptagonal Monopole (SHM) radiating element integrated with a Stepped Coplanar Waveguide (SCW) and an Asymmetric Ruby Shaped Monopole (ARSM) radiating element are placed above a conducting Modified Asymmetric Ground Plane (MAGP) configured to provide the distinct polarization characteristics for the desired resonance band.

According to an embodiment, a linear polarized radiator includes a Symmetric Heptagonal Monopole (SHM) radiating element integrated with a Stepped Coplanar Waveguide (SCW) configured to provide the desired resonance utilizing the quasi TEM structure.

According to an embodiment, a linear polarized radiator includes, a Symmetric Heptagonal Monopole (SHM) radiating element is achieved using the truncation technique to enhance the wideband behaviour of the radiator.

According to an embodiment, a linear polarized radiator includes, a Symmetric Heptagonal Monopole (SHM) radiating element providing the lowest resonance by altering the perimeter of the radiator.

According to an embodiment, a linear polarized radiator includes, a stepped coplanar waveguide (SCW) providing the multiple resonance mode characteristics thereby increases the robustness of the radiator.

According to an embodiment, a linear polarized radiator includes, a V-shaped slot, and the rectangular slots (SCW) are incorporated in the partial ground plane to improve the impedance matching in the entire UWB frequency range.

According to an embodiment, a circularly polarized radiator includes an Asymmetric Ruby Shaped Monopole (ARSM) radiating element using the truncation method and surface current method to provide the lowest resonance of the desired application band which reduces the overall area of the system and also introduces circular polarization.

According to an embodiment, a circularly polarized radiator includes, an Asymmetric Ruby Shaped Monopole (ARSM) radiating element with the feed shifted towards the right side of the radiator backed with an Asymmetric Ground Structure (AGS) to trace the surface current distribution generating the circular polarization.

According to an embodiment, a circularly polarized radiator includes, the truncation technique incorporated in the Modified Asymmetric Ground Plane (MAGP) backing the Asymmetric Ruby Shaped Monopole (ARSM) radiating element to enhance the Axial ratio bandwidth of the UWB frequency range.

According to an embodiment, a circularly polarized radiator includes an I-shaped slot and rectangular slots inserted in the Modified Asymmetric Ground Plane (MAGP) for providing good impedance matching in the desired resonance.

According to an embodiment, the dual-polarized MIMO system includes a linear polarized radiator and a circularly polarized radiator configured diagonal opposite to each other placed above a Modified Asymmetric Ground Plane (MAGP) to enhance the isolation between the radiators.

According to an embodiment, the dual-polarized MIMO system includes a linear polarized radiator and a circularly polarized radiator separated by Rectangular Slots and Stubs to further reduce the coupling effect between the radiators.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features, and advantages will occur to those skilled in the art from the following description of the preferred embodiment and the accompanying drawings in which.

Figure 1:
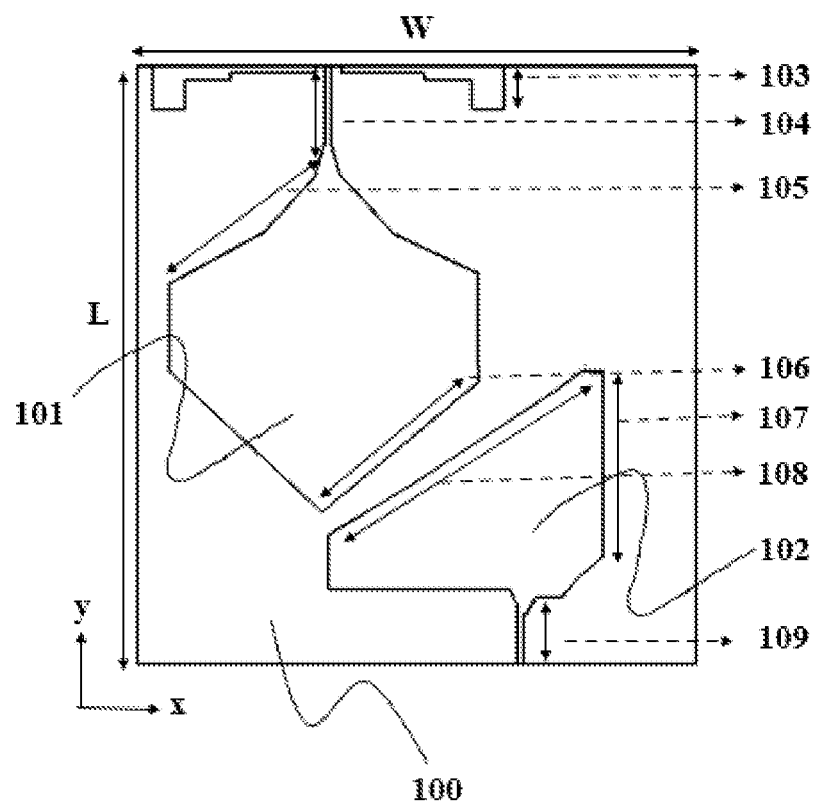
FIG. 1 illustrates a front view of the dual-polarized MIMO UWB system according to one embodiment of the present invention.

Although the specific features of the present invention are shown in some drawings and not in others. This is done for convenience only as each feature may be combined with any or all of the other features following the present invention.

DETAILED DESCRIPTION OF THE INVENTION

In the following detailed description, reference is made to the accompanying drawings that form a part hereof, and in which the specific embodiments that may be practised is shown by way of illustration. These embodiments are described in sufficient detail to enable those skilled in the art to practice the embodiments and it is to be understood that the logical, mechanical, and other changes may be made without departing from the scope of the embodiments. The following detailed description is therefore not to be taken in a limiting sense.

The various embodiments of the present invention provide a dual-polarized MIMO system contains a plurality of radiators with distinct polarization characteristics and with reduced interference between the radiators. The embodiments of the present invention provide a dual-polarized MIMO UWB system comprising of a Symmetric Heptagonal Monopole (SHM) radiating element coupled with the Stepped Co-Planar Waveguide (SCW) and an Asymmetric Ruby Shaped Monopole (ARSM) radiating element are positioned above a conducting Modified Asymmetric Ground Plane (MAGP) configured to provide resonance for the entire ultra-wideband frequency range.

According to an embodiment, the dual-polarized MIMO system, includes a Symmetric Heptagonal Monopole (SHM) radiating element integrated with a Stepped Coplanar Waveguide (SCW) and an Asymmetric Ruby Shaped Monopole (ARSM) radiating element are placed above a conducting Modified Asymmetric Ground Plane (MAGP) configured to provide the distinct polarization characteristics for the desired resonance band.

According to an embodiment, a linear polarized radiator includes a Symmetric Heptagonal Monopole (SHM) radiating element integrated with a Stepped Coplanar Waveguide (SCW) configured to provide the desired resonance utilizing the quasi TEM structure.

According to an embodiment, a linear polarized radiator includes, a Symmetric Heptagonal Monopole (SHM) radiating element is achieved using the truncation technique to enhance the wideband behaviour of the radiator.

According to an embodiment, a linear polarized radiator includes, a Symmetric Heptagonal Monopole (SHM) radiating element providing the lowest resonance by altering the perimeter of the radiator.

According to an embodiment, a linear polarized radiator includes, a stepped coplanar waveguide (SCW) providing the multiple resonance mode characteristics thereby increases the robustness of the radiator.

According to an embodiment, a linear polarized radiator includes, a V-shaped slot, and the rectangular slots (SCW) are incorporated in the partial ground plane to improve the impedance matching in the entire UWB frequency range.

According to an embodiment, a circularly polarized radiator includes, an Asymmetric Ruby Shaped Monopole (ARSM) radiating element using the truncation method and surface current method to provide the lowest resonance of the desired application band which reduces the overall area of the system and also introduces circular polarization.

According to an embodiment, a circularly polarized radiator includes an Asymmetric Ruby Shaped Monopole (ARSM) radiating element with the feed shifted towards the right side of the radiator backed with an Asymmetric Ground Structure (AGS) to trace the surface current distribution generating the circular polarization.

According to an embodiment, a circularly polarized radiator includes, the truncation technique incorporated in the Modified Asymmetric Ground Plane (MAGP) backing the Asymmetric Ruby Shaped Monopole (ARSM) radiating element to enhance the Axial ratio bandwidth of the UWB frequency range.

According to an embodiment, a circularly polarized radiator includes an I-shaped slot and rectangular slots inserted in the Modified Asymmetric Ground Plane (MAGP) for providing good impedance matching in the desired resonance.

According to an embodiment, the dual-polarized MIMO system includes a linear polarized radiator and a circularly polarized radiator configured diagonal opposite to each other placed above a Modified Asymmetric Ground Plane (MAGP) to enhance the isolation between the radiators.

According to an embodiment, the dual-polarized MIMO system includes a linear polarized radiator and a circularly polarized radiator separated by Rectangular Slots and Stubs to further reduce the coupling effect between the radiators.

FIG. 1 illustrates a dual-polarized MIMO UWB system 100, according to one embodiment of the present invention. The system includes a linear polarized radiator containing a Symmetric Heptagonal Monopole (SHM) radiating element 101 coupled with a Stepped Co-Planar Waveguide (SCW) 103, and a circularly polarized radiator containing an asymmetric Ruby Shaped Monopole (ARSM) radiating element 102, is configured above an Asymmetric Ground Plane (AGP) 200 comprises of V-shaped slot 204, I shaped slot 209, and Rectangular slots 205 206 207 208. In an embodiment, the monopole radiator 101 & 102 are printed on a Rogers's substrate having a width of 0.2 mm and a relative permittivity (εr) of 3.55 with a tangent loss 0.002.

Further, a linear polarized radiator containing a Symmetric Heptagonal Monopole (SHM) radiating element 101 is based on monopole technology to introduce linear polarization. It is a resonant mode that functions as an open resonator for radio waves, which contains standing waves of voltage and current along its length gets oscillated. The lowest resonating frequency is obtained by adjusting the perimeter of the Heptagonal radiator and also by adjusting the height of the feed 104. A Stepped coplanar waveguide (SCW) 103 is incorporated with Symmetric Heptagonal Monopole (SHM) radiating element 101 to enhance the multiple resonance modes using quasi TEM mode thereby covering the desired resonance. The truncation technique 105 106 is incorporated in the radiator to enhance the impedance bandwidth of the linear polarized radiator.

Further, the circularly polarized radiator containing an Asymmetric Ruby Shaped Monopole (ARSM) radiating element 102 is implemented for exciting the multiple modes to obtain ultra-wideband. Resonance at the lower frequency is decided by the length of the radiator 107 and the height of the feed 109. The feed length 109 is directly proportional to the lowest resonant frequency of the desired application band. An Asymmetric Ruby Shaped Monopole (ARSM) radiating element is formed by asymmetrically cutting the opposite sides of a square radiator 108 with the help of the feed shifted towards the right side 109 to introduce surface current distribution suitable for the circular polarization. The truncation technique greatly aids in reducing the overall size, maintains the wideband behaviour, and also improves impedance matching without affecting the bandwidth.

Figure 2:
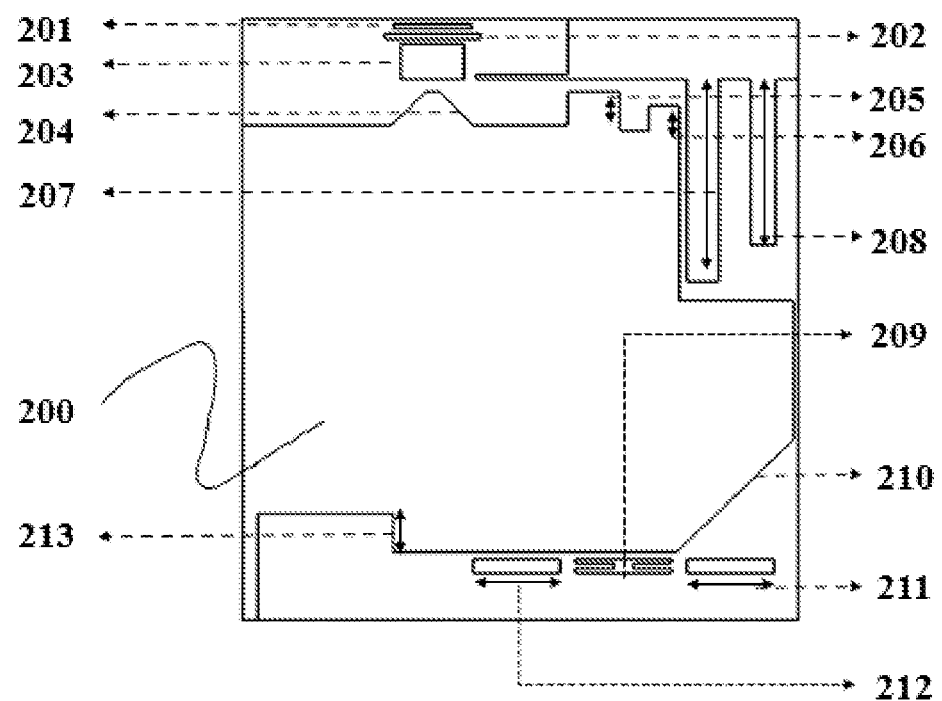
FIG. 2 illustrates a back view of the dual-polarized MIMO UWB system of FIG. 1, according to an embodiment of the present invention.

FIG. 2 illustrates a conducting Asymmetric ground plane (AGP) 200 of the miniaturized dual-polarized system 100. Three rectangular slots of different dimensions 201 202 203 are incorporated to introduce good impedance matching at the lower and middle ultra-wideband frequency of the linear polarized radiator. The V-shaped slot 204 improves the good impedance matching at the highest UWB frequency range. The rectangular slots 205 206 are incorporated near the linear polarized radiator for optimization to achieve the required axial ratio bandwidth in the entire UWB frequency range. The rectangular slots 207 208 are incorporated in between the radiating elements to improve the isolation in the lowest ultra-wideband frequency range. An I-shaped slot 209 and rectangular slots 211 212 are incorporated in the ground plane backing the Asymmetric Ruby Shaped Monopole (ARSM) radiating element 102. These slots help to stabilize the current distribution for circular polarization and also provide good impedance matching in the lowest frequency range of the circularly polarized radiator. The truncation 210 incorporated in the ground plane is useful for generating the circular polarization for the required application band. The rectangular stub 213 is added to the ground plane backing the circularly polarized radiator for providing good isolation at the highest frequency range. In an embodiment, the plurality of radiators containing a Symmetric Heptagonal Monopole radiating element (SHM) 101 and an Asymmetric Ruby Shaped Monopole (ARSM) radiating element 102 are placed diagonally opposite to each other thereby it further reduces the coupling between the radiators. The dual feed element delivers the available power to the linear polarized radiator and circularly polarized radiator using a separate feeding network. Rectangular slots and the truncation techniques compensate for the impedance mismatch created by the inductances of the coaxial probe (P1 & P2).

As a result, the dual-polarized MIMO UWB system provides a continuous resonance for the entire ultra-wideband suitable for short-range communication. The system 100 radiates only at desired bands with the reflection coefficient above 10 dB and isolation >15 dB. It offers both linear polarization and circular polarization accompanied by omnidirectional radiation pattern with the features such as spectrum efficiency, reduced fading, better isolation characteristics, and receiver connectivity suitable for medical imaging and short-range communication.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments.

It is to be understood that the phraseology or terminology employed herein is for description and not of limitation. Therefore, while the embodiments herein have been described in terms of preferred embodiments, those skilled in the art will recognize that the embodiments herein can be practised with modification within the spirit and scope of the appended claims.

Although the embodiments herein are described with various specific embodiments, it will be obvious for a person skilled in the art to practice the embodiments herein with modifications. Although the embodiments herein are described with various specific embodiments, it will be obvious for a person skilled in the art to practice the embodiments herein with modifications.

Advantages of the Invention

The embodiments of the present invention provide a dual-polarized MIMO UWB system using a plurality of radiators comprises of symmetric monopole radiator and asymmetric monopole radiator providing a distinct polarization characteristic such as linear and circular polarization and hence most feasible for medical imaging.

The embodiments of the present invention provide a MIMO system developed on a thin and low-cost dielectric substrate thereby reducing the cost of the overall system and enables easy fabrication.

The embodiments of the present invention provide a dual-polarized MIMO UWB system using a plurality of radiators configured to provide the lowest resonance of ultra-wide bandwidth by varying the physical length of the radiators.

The embodiments of the present invention provide a plurality of radiators designed out using some simple techniques such as coplanar waveguide technology, truncation technique, and slot insertion to provide the entire ultra-wide bandwidth and good isolation making it highly suited for short-range communication.

The embodiments of the present invention provide an independent utilization of each radiator using a separate feeding network and improve link reliability and reduce the multipath fading in the rich scattering environment.

The embodiments of the present invention provide a low transmit power and a low polarization loss in a linear polarized radiator and circularly polarized radiator which acts as a transmitter and receiver respectively.

The embodiments of the present invention provide a dual-polarized MIMO UWB system using a plurality of radiators which provides a good spectrum efficiency and improves the receiver sensitivity without affecting the polarization properties.

The embodiments of the present invention facilitate two radiators to provide a stable omnidirectional pattern with considerable gain and efficiency in a small aperture area.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments.

It is to be understood that the phraseology or terminology employed herein is for description and not of limitation. Therefore, while the embodiments herein have been described in terms of preferred embodiments, those skilled in the art will recognize that the embodiments herein can be practised with modification within the spirit and scope of the appended claims.

Although the embodiments herein are described with various specific embodiments, it will be obvious for a person skilled in the art to practice the embodiments herein with modifications. Although the embodiments herein are described with various specific embodiments, it will be obvious for a person skilled in the art to practice the embodiments herein with modifications.

We claim:

1. A dual-polarized MIMO UWB system 100 comprising:
 a Symmetric Heptagonal Monopole (SHM) radiating element combined with a Stepped Co-Planar Waveguide (SCW);
 an Asymmetric Ruby Shaped Monopole (ARSM) radiating element backed with a Modified Asymmetric Ground Plane (MAGP) to achieve circular polarization;
 a Stepped Coplanar Waveguide (SCW) incorporated in the top layer along with the Symmetric Heptagonal Monopole (SHM) radiating element to create multiple resonant modes facilitating the coverage of UWB frequency range a Modified Asymmetric Ground Plane (MAGP) with truncation;
 a set of rectangular shaped slots to stabilize the polarization and to enhance isolation between the radiators;
 a dual-feed network consisting of two different feed networks, one for circular polarized radiator (P1) and another for the linear polarized radiator (P2).

2. A dual-polarized MIMO UWB system as claimed in claim 1, wherein the linear polarized radiator is incorporated with truncation technique to obtain the Symmetric Heptagonal Monopole (SHM) to achieve the wideband behaviour covering the desired resonance.

3. A dual-polarized MIMO UWB system as claimed in claim 1, wherein the perimeter of the Symmetric Heptagonal Monopole (SHM) radiating element determines the lowest resonant frequency of the UWB system.

4. The dual-polarized MIMO ultra-wideband system as claimed in claim 1, wherein a stepped Coplanar Waveguide (SCW) is coupled near the feedline of the radiator to enhance the impedance bandwidth in the lowest and highest UWB frequency range using quasi TEM mode.

5. A dual-polarized MIMO UWB system as claimed in claim 1, wherein a V-Shaped slot is etched from the ground plane to contribute a good impedance matching in the lowest UWB frequency range of the SHM radiating element.

6. A dual-polarized MIMO UWB system as claimed in claim 1, wherein a set of rectangular slots of different sizes are incorporated in the ground plane in proximity to the SHM radiating element to improve the impedance matching and also to introduce the linear polarization for the desired resonance.

7. A dual-polarized MIMO UWB system as claimed in claim 1, wherein an Asymmetric Ruby Shaped Monopole (ARSM) radiating element is backed with Modified Asymmetric Ground Plane (MAGP) to realize circular polarization for the entire UWB frequency range.

8. A dual-polarized MIMO UWB system as claimed in claim 1, wherein an Asymmetric Ruby Shaped Monopole (ARSM) radiating element is formed by asymmetrically cutting the opposite edges of the square radiator with the feed point towards the right side and the truncation performed in the Asymmetric ground plane (AGP) helps in tuning the current distribution suitable for circular polarization.

9. A dual-polarized MIMO UWB system as claimed in claim 1, wherein an I-shaped slot is incorporated in the ground plane to achieve the impedance matching in the obtained upper UWB frequency range of ARSM radiating element.

10. A dual-polarized MIMO UWB system as claimed in claim 1, wherein a rectangular slot is incorporated in the ground plane to achieve the impedance matching in the mid-frequency range of the ARSM radiating element.

11. A dual-polarized MIMO UWB system as claimed in claim 1, wherein the ARSM radiating element and SHM radiating element arranged opposite to each other for reducing the coupling effect.

12. A dual-polarized MIMO UWB system as claimed in claim 1, wherein the rectangular slots are incorporated in the conducting ground plane between the ARSM radiating element and SHM radiating element to reduce the coupling effects.

* * * * *